US012784436B2

(12) United States Patent
Kim et al.

(10) Patent No.: US 12,784,436 B2
(45) Date of Patent: Nov. 3, 2026

(54) ELECTRONIC DEVICE AND CONTROLLING METHOD THEREOF

(71) Applicant: SAMSUNG ELECTRONICS CO., LTD., Suwon-si (KR)

(72) Inventors: Wookhyung Kim, Suwon-si (KR); Cheulhee Hahm, Suwon-si (KR); Namuk Kim, Suwon-si (KR); Anant Baijal, Suwon-si (KR); Jayoon Koo, Suwon-si (KR); Ilhyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 18/814,120

(22) Filed: Aug. 23, 2024

(65) Prior Publication Data

US 2024/0420463 A1 Dec. 19, 2024

Related U.S. Application Data

(63) Continuation of application No. PCT/KR2023/002496, filed on Feb. 22, 2023.

(30) Foreign Application Priority Data

Feb. 23, 2022 (KR) ........................ 10-2022-0023892
Jun. 3, 2022 (KR) ........................ 10-2022-0068461

(51) Int. Cl.
*G06V 10/98* (2022.01)
*G06V 10/82* (2022.01)

(52) U.S. Cl.
CPC ............ *G06V 10/993* (2022.01); *G06V 10/82* (2022.01)

(58) Field of Classification Search
CPC .......... G06V 10/82; G06T 2207/20081; G06T 2207/20084; G06T 2207/30168; G06N 3/04; G06N 3/045
See application file for complete search history.

(56) References Cited

U.S. PATENT DOCUMENTS 8,395,708 B2 3/2013 Lee et al.
10,721,477 B2 7/2020 Li et al.
(Continued)

FOREIGN PATENT DOCUMENTS

CN 105574885 A 5/2016
CN 109255540 A 1/2019
(Continued)

OTHER PUBLICATIONS

J. Kim, W. Kim and S. Lee, "Deep Blind Image Quality Assessment by Learning Sensitivity Map," 2018 IEEE International Conference on Acoustics, Speech and Signal Processing (ICASSP), 2018, pp. 6727-6731, doi: 10.1109/ICASSP.2018.8462369.
(Continued)

*Primary Examiner* — Molly Wilburn
(74) *Attorney, Agent, or Firm* — Sughrue Mion, PLLC

(57) ABSTRACT

An electronic device includes a memory configured to store a trained neural network model and a processor configured to, by inputting an input image to the trained neural network model, obtain a quality score of the input image, a pixel quality score for each pixel included in the input image and a Region of Interest (ROI) score for the each pixel. The trained neural network obtains feature information for each pixel in the input image, a quality score of each pixel, and an ROI score for the each pixel. A computation module obtains an image quality score for the input image based on pixel quality score and the ROI score for the each pixel.

20 Claims, 14 Drawing Sheets

(56) References Cited

U.S. PATENT DOCUMENTS

| | | | | |
|---|---|---|---|---|
| 10,755,413 | B1 | 8/2020 | Putha et al. | |
| 12,574,566 | B2 * | 3/2026 | Li | G06N 3/0455 |
| 2018/0114082 | A1 | 4/2018 | Choi et al. | |
| 2022/0036536 | A1 | 2/2022 | Baijal et al. | |
| 2022/0101123 | A1 | 3/2022 | Kim et al. | |
| 2022/0180625 | A1 | 6/2022 | Ahn | |
| 2025/0056066 | A1 * | 2/2025 | Li | G06N 3/0455 |

FOREIGN PATENT DOCUMENTS

| | | | |
|---|---|---|---|
| CN | 110599468 | A | 12/2019 |
| CN | 111325051 | A | 6/2020 |
| CN | 112767385 | A | 5/2021 |
| KR | 10-1351126 | B1 | 1/2014 |
| KR | 10-2018-0044742 | A | 5/2018 |
| KR | 10-2018-0109665 | A | 10/2018 |
| KR | 10-2020-0116973 | A | 10/2020 |
| KR | 10-2021-0026618 | A | 3/2021 |
| KR | 10-2284096 | B1 | 7/2021 |
| KR | 10-2295652 | B1 | 8/2021 |
| KR | 10-2313662 | B1 | 10/2021 |
| KR | 10-2022-0014715 | A | 2/2022 |
| KR | 10-2022-0043764 | A | 4/2022 |

OTHER PUBLICATIONS

D. Pan, P. Shi, M. Hou, Z. Ying, S. Fu and Y. Zhang, "Blind Predicting Similar Quality Map for Image Quality Assessment," 2018 IEEE/CVF Conference on Computer Vision and Pattern Recognition, arXiv:1805.08493v2 [cs.CV], Mar. 10, 2019, 11 pages, doi: 10.1109/CVPR.2018.00667.

J. Kim, A.-D. Nguyen and S. Lee, "Deep CNN-Based Blind Image Quality Predictor," in IEEE Transactions on Neural Networks and Learning Systems, vol. 30, No. 1, 14 pages, Jan. 2019, doi: 10.1109/TNNLS.2018.2829819.

Extended European Search Report issued Mar. 17, 2025 by the European Patent Office for EP Patent Application No. 23760368.3.

International Search Report (PCT/ISA/210) issued May 26, 2023 by the International Searching Authority in the International Patent Application No. PCT/KR2023/002496.

Written Opinion (PCT/ISA/237) issued May 26, 2023 by the International Searching Authority in the International Patent Application No. PCT/KR2023/002496.

Kim, Wook-Hyung et al., "Pixel-by-pixel Mean Opinion Score (pMOS) for No-Reference Image Quality Assessment", arXiv:2206.06541, Jun. 2022. (17 pages total).

* cited by examiner

ELECTRONIC DEVICE AND CONTROLLING METHOD THEREOF

CROSS REFERENCE TO RELATED APPLICATIONS

This is a continuation of international application PCT/KR2023/002496 filed on Feb. 22, 2023 in the Korean Patent Office (KIPO) and claims priority to KR 10-2022-0023892 filed on Feb. 23, 2022 in KIPO and KR 10-2022-0068461 filed on Jun. 3, 2022 in KIPO. The content of the above applications are incorporated herein by reference.

BACKGROUND

Field

The present disclosure relates to an electronic device and a controlling method thereof, and more particularly to, an electronic device that performs quality evaluation of an image using a trained neural network model and a controlling method thereof.

Description of the Related Art

With the development of electronic technology, various types of electronic devices are being developed and popularized. In particular, methods for evaluating the quality of images/videos are being developed to improve the quality of images/videos. In general, such quality evaluation is most accurate when performed by experts, but it is time-consuming and expensive.

To overcome this problem, artificial intelligence-based image/video quality evaluation methods are also developing, but such artificial intelligence-based quality evaluation techniques perform quality evaluation only on a frame-by-frame basis and not on a pixel-by-pixel basis of the images or videos and thus, it is difficult to utilize those artificial intelligence-based quality evaluation techniques for various applications (e.g., Super-Resolution, Denoise, Deblur) that improves image quality on a pixel-by-pixel basis.

In addition, in order to train an artificial intelligence model capable of performing per-pixel quality evaluation, a dataset of per-pixel quality ratings within each image frame is required, but acquiring such a dataset is time-consuming and expensive.

SUMMARY

An electronic device including: a memory configured to store a trained neural network model; and a processor configured to, by inputting an input image to the trained neural network model, obtain an image quality score of the input image, a pixel quality score for each pixel included in the input image and a Region of Interest (ROI) score for the each pixel, wherein the trained neural network model includes: a first neural network module configured to obtain first feature information for the each pixel included in the input image; a second neural network module configured to obtain second feature information for the each pixel included in the input image; a third neural network module configured to obtain a first pixel quality score of each pixel included in the input image based on third feature information in which the first feature information and the second feature information are combined; a fourth neural network module configured to obtain an ROI score for the each pixel based on fourth feature information in which the first feature information and the second feature information are combined; and a computation module configured to obtain the image quality score of the input image based on the first pixel quality score for the each pixel and the ROI score for the each pixel.

A controlling method of an electronic device, the controlling method including: by inputting an input image to a trained neural network model, obtaining an image quality score of the input image, a pixel quality score for each pixel included in the input image and a Region of Interest (ROI) score for the each pixel, wherein the trained neural network model includes a first neural network module, a second neural network module, a third neural network module, a fourth neural network module, and a computation module; wherein the obtaining includes: by the first neural network module, obtaining first feature information for the each pixel included in the input image; by the second neural network module, obtaining second feature information for the each pixel included in the input image; by the third neural network module, obtaining a first pixel quality score for the each pixel included in the input image based on third feature information in which the first feature information and the second feature information are combined; by the fourth neural network module, obtaining an ROI score for the each pixel based on fourth feature information in which the first feature information and the second feature information are combined; and by the computation module, obtaining the image quality score of the input image based on the first pixel quality score for the each pixel and the ROI score of the each pixel.

Also provided herein is a non-transitory computer readable recording medium storing computer instructions that, when executed by a processor of an electronic device, cause the electronic device to perform an operation, the operation includes: by inputting an input image to a trained neural network model, obtaining an image quality score of the input image, a first pixel quality score for each pixel included in the input image and a Region of Interest (ROI) score for the each pixel, wherein the trained neural network model includes a first neural network module, a second neural network module, a third neural network module, a fourth neural network module, and a computation module; wherein the obtaining includes: by the first neural network module, obtaining first feature information for the each pixel included in the input image; by the second neural network module, obtaining second feature information for the each pixel included in the input image; by the third neural network module, obtaining a quality score for the each pixel included in the input image based on third feature information in which the first feature information and the second feature information is combined; by the fourth neural network module, obtaining an ROI score for the each pixel based on fourth feature information in which the first feature information and the second feature information is combined; and by the computation module, obtaining the image quality score of the input image based on the first pixel quality score for the each pixel and the ROI score of the each pixel.

DETAILED DESCRIPTION

Figure 1:
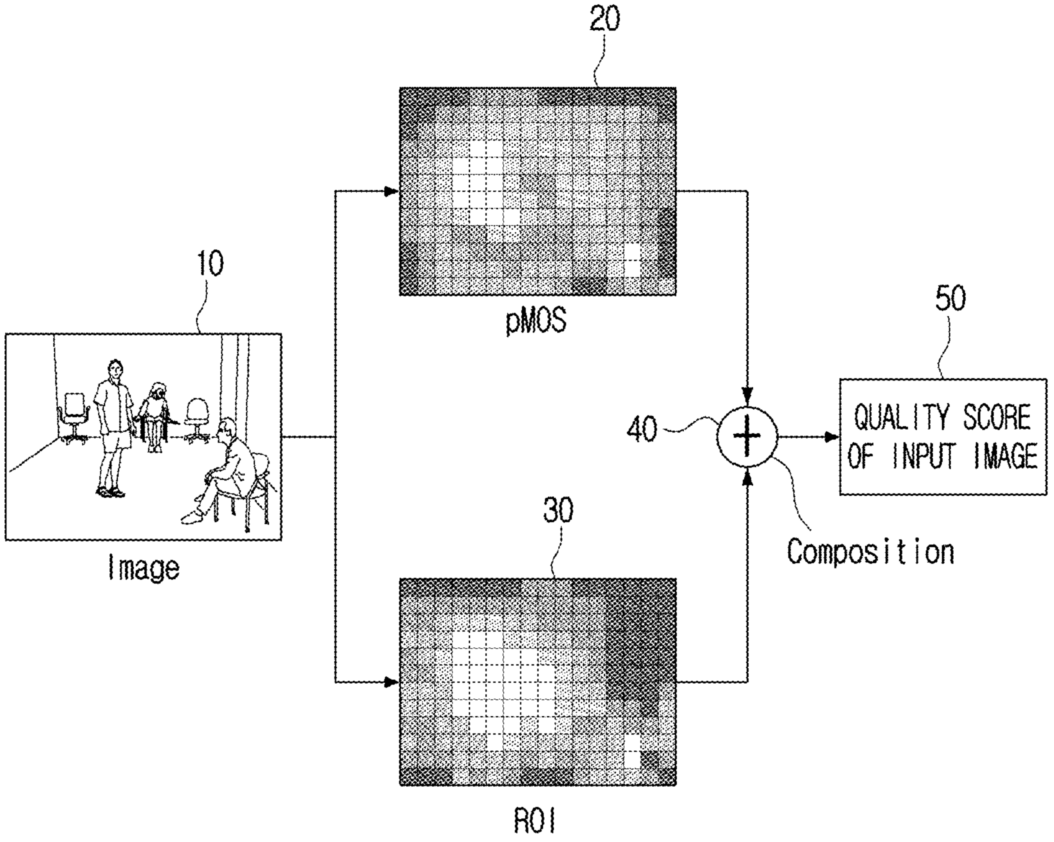
FIG. 1 is a view provided to schematically explain a method of obtaining a quality score of an input image according to an exemplary embodiment.

Hereinafter, the present disclosure will be described in detail with reference to the accompanying drawings.

The terms used in the disclosure will be described briefly, and the present disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, the expressions "have", "may have", "include" and or "may include" used herein indicate existence of corresponding features (e.g., elements such as numeric values, functions, operations, or parts) but do not exclude presence of additional features.

An expression, "at least one of A or/and B" may indicate at least one of "A", "B", or "both of A and B."

Expressions "first", "second", "$1^{st}$," "$2^{nd}$," or the like, used in the disclosure may indicate various components regardless of sequence and/or importance of the components, will be used only in order to distinguish one component from the other components, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through still another component (for example, a third component).

Singular forms used herein are intended to include plural forms unless explicitly indicated otherwise. It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not shown) except for a 'module' or an 'unit' that needs to be implemented by specific hardware.

In addition, in the present disclosure, "deep neural network (DNN)" is a representative example of an artificial neural network model that simulates brain neurons and is not limited to an artificial neural network model using a particular algorithm.

Further, in the present disclosure, "parameters" are values utilized in the computational process of each layer of a neural network and may include, for example, weights used when applying input values to a predetermined computation formula. In addition, the parameters may be represented in the form of a matrix. The parameters are values that are set as a result of training and may be updated as needed with additional training data.

Hereinafter, an embodiment of the present disclosure will be described in greater detail with reference to the accompanying drawings.

FIG. 1 is a view provided to schematically explain a method of obtaining a quality score of an input image according to an embodiment.

An electronic device according to an embodiment may be implemented to obtain a quality score of an input image (or image frame) using a trained neural network model (or artificial neural network). For example, the quality score 50 of the input image ("image quality score") may be a Mean Opinion Score (MOS) that represents the overall quality of the image as a whole. According to an embodiment, the quality score is a relative quality evaluation score corresponding to each image, which may have a normalized value, such as, but not limited to, a value between 0 and 5.

Meanwhile, the trained neural network model may comprise a plurality of neural network layers. Each of the plurality of neural network layers may include a plurality of parameters (or a plurality of weight values), and a neural network operation may be performed by computation between the computation results of the previous layer and the plurality of parameters. The parameters included in the plurality of neural network layers may be optimized based on the learning results of the trained neural network model. For example, during the training process, the parameters (or weights) may be updated to reduce or minimize a loss value or cost value obtained by the trained neural network model.

Artificial neural networks may include deep neural networks (DNNs), such as, but not limited to, convolutional neural networks (CNNs), recurrent neural networks (RNNs), restricted Boltzmann machines (RBMs), deep belief networks (DBNs), bidirectional recurrent deep neural networks (BRDNNs), or deep Q-networks.

Referring to FIG. 1, an electronic device according to one embodiment may, when an image 10 is input, input it into a trained neural network model to obtain a per-pixel quality score 20 (or per-pixel-Mean-Opinion-Score (pMOS)) and a per-pixel Region-of-Interest (ROI) score 30 of the input image 10.

Here, the per-pixel quality score 20 may be a quality evaluation score corresponding to each pixel in the input image, and the per-pixel ROI score 30 may be information regarding a probability value that each pixel in the input image corresponds to a region of interest (ROI). For example, the per-pixel quality score 20 and the per-pixel ROI score 30 may be relative values, but are not necessarily limited thereto.

Meanwhile, according to an embodiment, as shown in FIG. 1, the output of the trained neural network model may be obtained as image information comprising an image representing a per-pixel quality score 20 and a per-pixel ROI score 30. For example, the quality score magnitude and ROI score magnitude may be proportional to a gray scale value, such as a brightness of the pixel. For example, the larger the brightness, the larger the quality score and ROI score may be relatively larger, but is not limited thereto. However, it should be appreciated that, according to other embodiments, the quality score and ROI score corresponding to the position of each pixel may be obtained in numerical form. For example, the electronic device may set a predetermined brightness value of a pixel as 0, and obtain the brightness value of each pixel in the form of a score based on 0. For example, the electronic device may set a specific brightness range of a pixel, and add a weight to the brightness value of each pixel based on the set brightness range, and obtain a score for each pixel based on the added weight.

Subsequently, according to one embodiment, the electronic device may obtain a quality score 50 of the input image based on the per-pixel quality score 20 and the per-pixel ROI score 30 computed through a computation module 40 within the trained neural network model.

Hereinafter, various embodiments will be described, including a method of training a neural network model and a specific method of using the trained neural network model to obtain a per-pixel quality score, a per-pixel ROI score, and a quality score of an input image.

Figure 2:
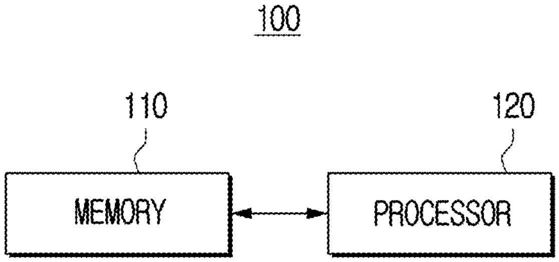
FIG. 2 is a block diagram illustrating configuration of an electronic device according to an exemplary embodiment.

FIG. 2 is a block diagram illustrating configuration of an electronic device according to an embodiment.

Referring to FIG. 2, an electronic device 100 includes a memory 110 and a processor 120.

The electronic device 100 may be implemented as various types of devices capable of providing content, such as a content providing server, a PC, or the like. Alternatively, the electronic device 100 may be a system itself on which a cloud computing environment is established. However, the electronic device 100 is not limited thereto, and the electronic device 100 may also be implemented as various types of image processing devices that receive and process the input of an image, such as television, set-top box, tablet personal computer, mobile phone, desktop personal computer, laptop personal computer, netbook computer, etc.

According to an embodiment, the electronic device 100 may receive various compressed images or images of various resolutions. For example, the electronic device 100 may receive images in a compressed from, which are compressed in Moving Picture Experts Group (MPEG) (e.g., MP2, MP4, MP7, etc.), joint photographic coding experts group (JPEG), Advanced Video Coding (AVC), H.264, H.265, High Efficiency Video Codec (HEVC), etc. Alternatively, the electronic device 100 may receive one of images from among in any one of standard definition (SD), high definition (HD), full HD, or ultra HD images.

The memory 110 may store data necessary for various embodiments of the present disclosure. The memory 110 may be implemented in a memory form embedded in the electronic device 100 or in a memory form detachable from the electronic device 100 according to the data storage purpose. For example, data for driving the electronic device 100 may be stored in the memory embedded in the electronic device 100, and data for the expansion function of the electronic device 100 may be stored in the memory detachable from the electronic device 100. Meanwhile, the memory embedded in the electronic device 100 may be implemented as at least one of a volatile memory (e.g. a dynamic RAM (DRAM), a static RAM (SRAM), or a synchronous dynamic RAM (SDRAM)), a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)). For example, data for driving the electronic device 100 may be stored in the memory embedded in the electronic device 100, and data for the expansion function of the electronic device 100 may be stored in the memory detachable from the electronic device 100. Meanwhile, the memory embedded in the electronic device 100 may be implemented as at least one of a volatile memory (e.g. a dynamic RAM (DRAM), a static RAM (SRAM), or a synchronous dynamic RAM (SDRAM)) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)). In addition, the memory detachable from the electronic device 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

According to an embodiment, the memory 110 may store a computer program comprising at least one instruction or a set of instructions for controlling the electronic device 100.

According to another embodiment, the memory 110 may store information regarding a trained neural network model comprising a plurality of layers. Here, storing information regarding a neural network model may mean storing various information related to the operation of the neural network model, such as information regarding the plurality of layers included in the neural network model, information regarding parameters, biases, etc. utilized by each of the plurality of layers, and the like. It should be appreciated, however, that depending on the implementation of the processor 120 described below, information regarding the neural network model may be stored in the internal memory of the processor 120. For example, if the processor 120 is implemented as dedicated hardware, the information regarding the neural network model may be stored in the internal memory of the processor 120.

According to another embodiment, the memory 110 may store a video (or an image) received from an external device (e.g., a source device), an external storage medium (e.g., USB), an external server (e.g., a web hard), or the like. Here, the video may be, but is not limited to, a digital video.

At least one processor 120 (hereinafter, referred to as the processor) is electrically connected to the memory 110 to control the overall operation of the electronic device 100. The processor 120 may comprise one or a plurality of processors. Specifically, the processor 120 may execute at least one instruction stored in the memory 110 to perform operations of the electronic device 100 in accordance with various embodiments of the present disclosure.

According to an embodiment, the processor 120 may be implemented as a digital signal processor (DSP) for processing digital image signals, a microprocessor, a Graphics Processing Unit (GPU), an Artificial Intelligence (AI) processor, a Neural Processing Unit (NPU), or a time controller (TCON), but is not limited thereto. The processor 120 may include at least one of a central processing unit (CPU), a micro controller unit (MCU), a micro processing unit (MPU), a controller, an application processor (AP), a communication processor (CP), or an ARM processor, or may be defined as the corresponding term. In addition, the processor 120 may be implemented as a System on Chip (SoC) integrated with a processing algorithm, a large scale integration (LSI), or in the form of an application specific integrated circuit (ASIC) or a field programmable gate array (FPGA). Items indicated as unit or module in this application (for example, combining module 270, the neural network modules, computation module 290) may be implemented by a CPU executing instructions from a memory, or by custom hardware, or by a combination of hardware and software.

According to an embodiment, the processor 120 may be implemented as a digital signal processor (DSP), a microprocessor, or a time controller (TCON). However, the processor is not limited thereto, and the processor 120 may include at least one of a central processing unit (CPU), a micro controller unit (MCU), a micro processing unit (MPU), a controller, an application processor (AP), a communication processor (CP), an ARM processor, or may be defined as the corresponding term. In addition, the processor 120 may be implemented as a System on Chip (SoC) integrated with a processing algorithm, a large scale integration (LSI), or in the form of a field programmable gate array (FPGA).

In addition, the processor 120 for running the artificial intelligence model (or neural network model) according to an embodiment may be implemented through a combination of a general-purpose processor such as a CPU, AP, digital signal processor (DSP), etc., a graphics-only processor such as a GPU, a vision processing unit (VPU), or an artificial intelligence-specific processor such as an NPU and software.

The processor 120 may control the input data to be processed according to predefined operation rules or a neural network model stored in the memory 110. Alternatively, when the processor 120 is a dedicated processor (or an artificial intelligence dedicated processor), it may be designed with a hardware structure specialized for processing a specific artificial intelligence model. For example, hardware specialized for processing a specific artificial intelligence model can be designed as a hardware chip such as ASIC or FPGA. When the processor 120 is implemented as a dedicated processor, it may be implemented to include a memory for implementing an embodiment of the present disclosure, or may be implemented to include a memory processing function for using an external memory.

According to an embodiment, the processor 120 may input an input image (or image) into a trained neural network model to obtain a quality score for the input image, a per-pixel quality score for the pixels included in the input image, and a per-pixel region of interest (ROI) score. This will be described in greater detail with reference to FIGS. 3A and 3B below.

Figure 3A:
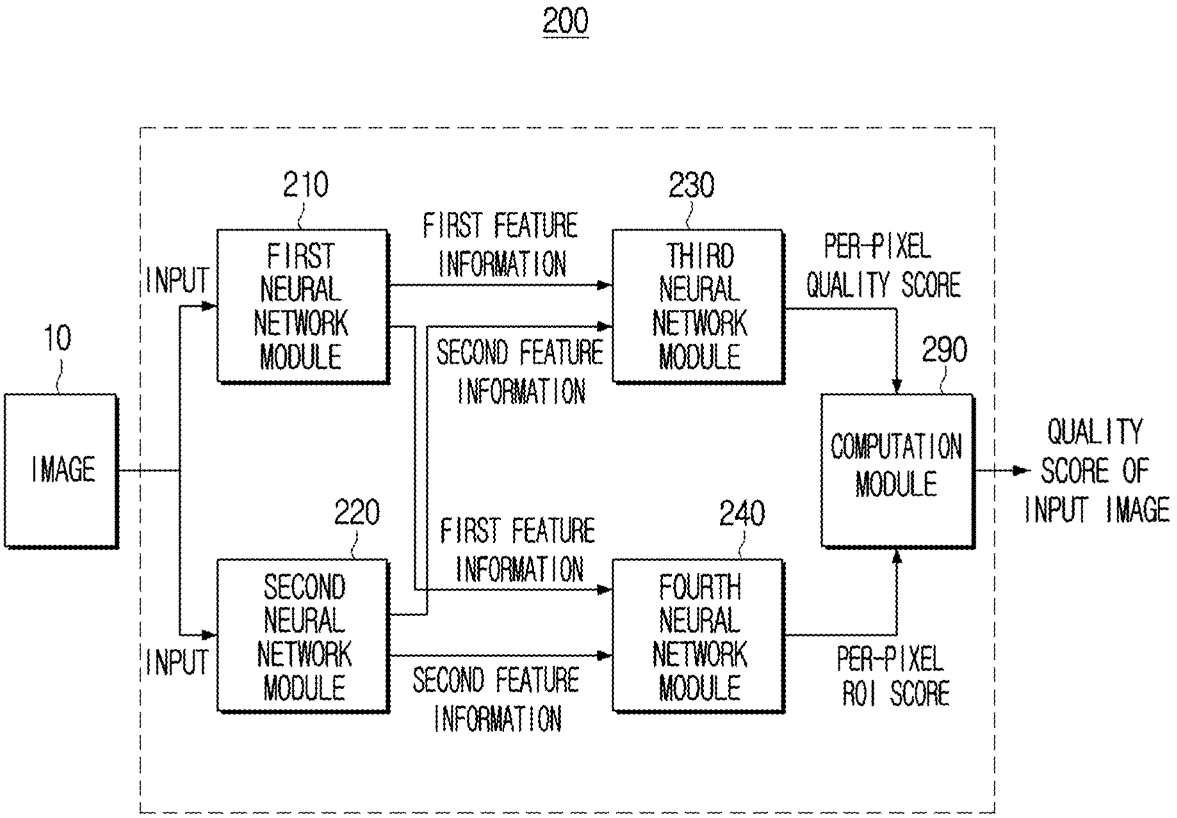
FIG. 3A is a view provided to explain a method of obtaining a quality score of an input image using a trained neural network model.

FIG. 3A is a view provided to explain a method of obtaining a quality score of an input image using a trained neural network model.

Referring to FIG. 3A, a trained neural network model 200 according to an embodiment may include a first neural network module (or, first module, 210), a second neural network module (or, second module, 220), a third neural network module (or, third module, 230), a fourth neural network module (or, fourth module, 240), and a computation module 290. Each of the first neural network module to the fourth neural network module, and the computation module 290 may include a plurality of neural network layers. Here, each of the plurality of neural network layers included in each neural network module may include a plurality of parameters, and the trained neural network model may perform neural network computation through computation between the computation results of the previous layer and the plurality of parameters.

Firstly, according to an embodiment, when the image 10 is input into the input layer of the first neural network module 210, the first neural network module 210 may output per-pixel first feature information included in the input image 10. Here, the first neural network module 210 is a module that extracts local features of the input image 10, for example, edges or noises such as points present in the image. According to an embodiment, the first feature information may include at least one of edge information and noise information included in the input image 10.

Meanwhile, according to an embodiment, when the image 10 is input into the input layer of the second neural network module 220, the second neural network module 220 may output per-pixel second feature information included in the input image 10. Here, the second neural network module 220 is a module that extracts high-level features of the input image 10. According to an embodiment, the second feature information may include feature information such as category (or type) information of an object identified in the input image and appearance information of the object. In other words, the first neural network module 210 may extract local features such as outlines, points, etc. of the input image 10, and the second neural network module 220 may output relatively meaningful high-level features such as categories of objects present in the input image 10 and identifiable appearance information of the objects.

According to an embodiment, the second neural network module 220 may be a neural network model with some layers changed from InceptionResNetV2. InceptionResNetV2 is a neural network model that is trained to classify objects present in the input image 10, for example, about 1000 objects, including keyboards, mice, pencils, and animals, into specific categories, and may extract features such as the category of the objects and identifiable appearance of the objects present in the input image. The second neural network module 220 will be described in greater detail with reference to FIG. 4.

Meanwhile, according to an embodiment, the third feature information, which is a combination of the first feature information output from the output layer of the first neural network module 210 and the second feature information output from the output layer of the second neural network module 220, may be input into the input layer of the third neural network module 230. Subsequently, the third neural network module 230 may obtain a per-pixel quality score ("first pixel quality score") of the input image 10 based on the input third feature information. Here, the third neural network module 230 is a neural network module that utilizes the extracted feature information of the input image 10 to output a quality evaluation score corresponding to each of the pixels in the input image 10. Meanwhile, according to an embodiment, the third feature information may be information in which the first feature information and the second feature information is combined successively, and may be combined through a combining module (not shown) present in the trained neural network model. This will be described in greater detail with reference to FIG. 4.

Meanwhile, according to an embodiment, the fourth feature information, which is a combination of the first feature information output from the output layer of the first neural network module 210 and the second feature information output from the output layer of the second neural network module 220, may be input into the input layer of the fourth neural network module 240. Subsequently, the fourth neural network module 240 may obtain a per-pixel ROI score of the pixels included in the input image 10 based on the input fourth feature information. Here, the fourth neural network module 240 is a module that extracts a region of interest (ROI) of the input image 10 using the extracted feature information of the input image 10, and extracts a per-pixel ROI score based on the extracted region of interest (ROI). Meanwhile, according to an embodiment, the fourth feature information is information in which the first feature information and the second feature information is combined successively, and may be combined through a combining module (not shown) present in the trained neural network model. This will be described in detail with reference to FIG. 4.

Subsequently, according to an embodiment, the computation module 290 may obtain a quality score of the input image based on the per-pixel quality score obtained from the third neural network module 230 and the per-pixel ROI score obtained from the fourth neural network module 240. According to an embodiment, the computation module 290 may obtain a first value by multiplying the quality score and the ROI score corresponding to each pixel in the image, and output a representative value (e.g., an average value, a maximum value, a minimum value, etc.) of the obtained first value of each of the pixels in the image as the quality score of the input image ("image quality score"). Accordingly, the processor 120 may obtain a per-pixel quality score of the input image, a per-pixel ROI score, and a quality score of the input image.

Figure 3B:
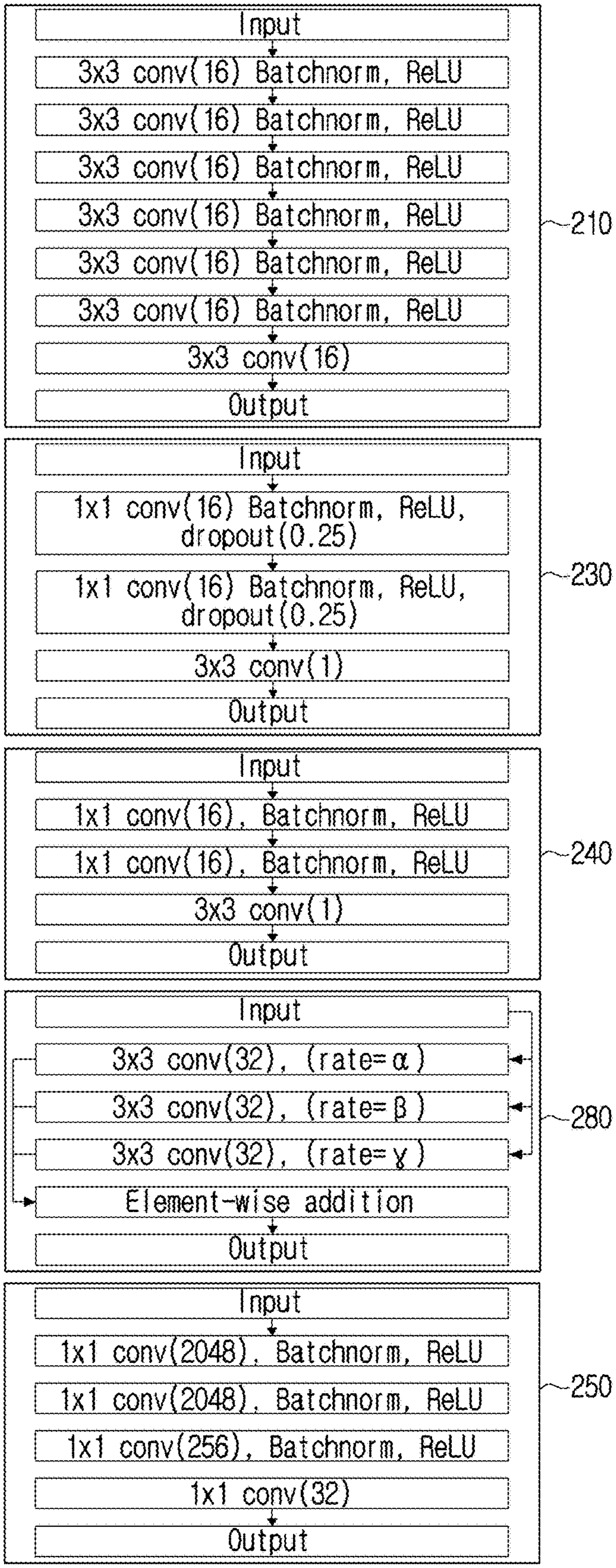
FIG. 3B is a view provided to explain detailed configuration of a plurality of modules present in a trained neural network model according to an exemplary embodiment.

FIG. 3B is a view provided to explain detailed configuration of a trained neural network model according to an embodiment.

The trained neural network model 200 includes a plurality of neural network modules 210 to 280, and each of the plurality of neural network layers included in each of the plurality of neural network modules includes a plurality of parameters. Each neural network module may perform a neural network operation through computation between the computation results of the previous layer and the plurality of parameters. Meanwhile, the trained neural network model may use, for example, CNN-based VDSR techniques (Jiwon Kim, et al., Accurate Image Super-Resolution Using Very Deep Convolutional Networks, CVPR 2016), Enhanced Deep Residual Networks for Single Image Super-Resolution (EDSR), Deeply-Recursive Convolutional Network for Image Super-Resolution (DRCN). Proceedings of the IEEE Conference on Computer Vision and Pattern Recognition. 2016), Multi-scale deep super-resolution system (MDSR), etc., but is not limited thereto.

According to an embodiment, the plurality of neural network modules 210 to 280 may perform neural network computation processing through any of the layers included within each neural network module. For example, each convolutional layer included in a convolutional neural network (CNN) may apply one or more filters (or kernels) with respect to the input data. If n filters are applied in any convolutional layer, the output data may have n channels. Here, the filters may be of the form n*n. For example, as shown in FIG. 3B, if 16 filters of the form 3*3 are applied in a particular convolutional layer, the number of channels in the output data may be 16. Meanwhile, in another example, n in conv(n) in FIG. 3B may refer to the number of channels that are output.

According to an embodiment, each neural network module may output computational data that is output via an activation function, e.g., a rectified linear unit (ReLU) operation, after applying a convolutional filter in any layer. In this case, the computational data output from the layer may be multichannel data, for example, 16 feature map (or activation map) data may be output and provided to the next layer. However, according to an embodiment, the feature map data may be stored in a memory (internal buffer or external memory) and provided to the next layer, but this configuration is omitted in FIG. 3B. Here, a parameter may have the same meaning as a weight (or coefficient) of a filter.

Firstly, according to an embodiment, the layers of the first neural network module 210 may have local features and narrow receptive fields to extract per-pixel features within the input image 10. According to an embodiment, the first neural network module 210 comprises a total of seven layers. The first neural network module 210 may perform a convolutional operation (e.g., a convolutional operation having 16 channels with a 3*3 filter), a batch normalization operation, or a ReLU operation through each layer included in the module, and the output data from each layer may be provided to the next layer. However, as shown in FIG. 3B, for the last layer, the batch normalization and ReLU operations may not be performed.

According to an embodiment, the third neural network module 230 may comprise a total of three layers. As shown in FIG. 3B, the third neural network module 230 may perform a convolutional operation (1*1 or 3*3 filter), a batch normalization operation, a ReLU operation, or a dropout operation through each of the layers included within the module. In this case, the output data from each layer may be provided to the next layer. In this case, the output data from each layer may be provided to the next layer. Here, the dropout operation means that if the result is excessively overfitted by the experimental data, some units in the hidden layer are disabled to prevent overfitting.

Meanwhile, according to an embodiment, the fourth neural network module 240 may comprise a total of three layers. As shown in FIG. 3B, the fourth neural network module 240 may perform a convolutional operation (1*1 or 3*3 filter), a batch normalization operation, or a ReLU operation through each of the layers included in the module. In this case, the output data from each layer may be provided to the next layer. In other words, the fourth neural network module has the same structure as the module with the dropout operations removed from the third neural network module.

Meanwhile, according to an embodiment, the fourth neural network model 240 performs a normalization operation on the last layer. In this case, the normalization process may be a linear normalization rather than the commonly used softmax normalization. Equation 1 below is a formula for linear normalization according to an embodiment.

$$r_{(i,j)} = \frac{x_{(i,j)}}{\sum_{i=1}^{M}\sum_{j=1}^{N} x_{(i,j)}}. \quad \text{[Equation 1]}$$

Here, $x=(x_{(1,1)}, \ldots, x_{(M,N)})$ is the set of unnormalized ROI predictions and $r=(r_{(1,1)}, \ldots, r_{(MM)})$ is the set of linear normalized ROI predictions.

Further, according to an embodiment, the first compression module 250 may comprise a total of four layers. The first compression module 250 may perform a convolutional operation (e.g., a convolutional filter having 2048 channels with a 1*1 filter or a convolutional filter having 256 channels with a 1*1 filter), a batch normalization operation, or a ReLU operation through each layer included in the module, and the output data from each layer may be provided to the next layer. Batch normalization is an operation that normalizes the input data by batches. Meanwhile, as shown in FIG. 3B, for the last layer, the batch normalization and ReLU operations may not be performed.

In addition, according to an embodiment, the second compression module 280 may comprise a total of four layers. As shown in FIG. 3B, the second compression module 280 may perform a convolution operation (3*3 filter) or an element-wise addition operation (or operation for each element) through each of the layers included in the module. Here, the output data from the plurality of layers performing the convolution operation may be input to the layer performing the element-wise addition, and the element-wise operation of each data may be performed in the layer.

Meanwhile, according to an embodiment, the second compression module 280 may be a dilated inception module (DIM). The DIM has low computational complexity and has a relatively large receptive field (the area of the image that may be covered by one filter for the input image at each stage) compared to other neural network modules. In this case, the receptive field covers a high percentage of the input image, so it has the effect of learning implicitly if there is a center-bias.

Meanwhile, in the above-described embodiments, the number of layers included in each module and the form of implementation are, of course, only examples and the present disclosure is not limited thereto.

Figure 4:
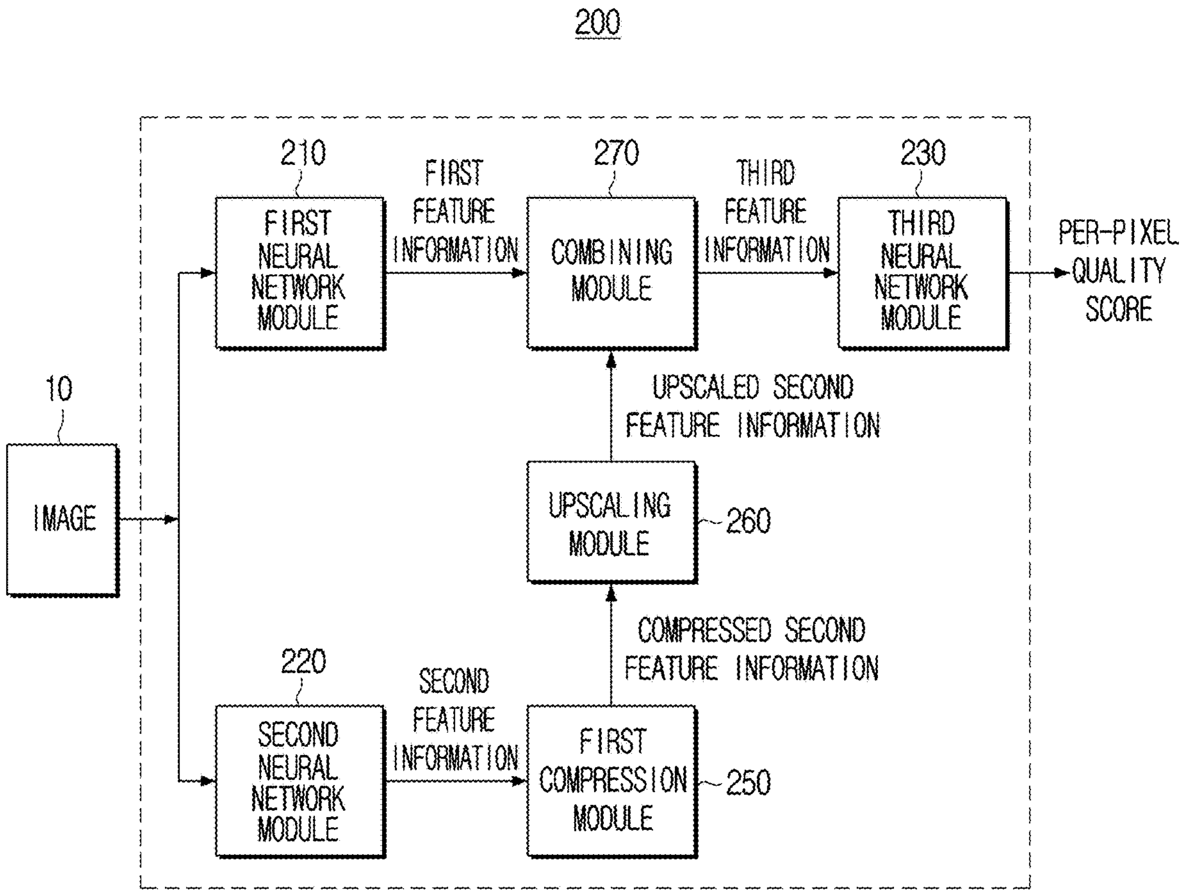
FIG. 4 is a view provided to explain a method of obtaining a quality score for each pixel according to an exemplary embodiment.

FIG. 4 is a view provided to explain a method of obtaining a quality score for each pixel according to an embodiment.

Referring to FIG. 4, according to an embodiment, the processor 120 may first input the image 10 into the trained neural network model 200. When the image 10 is input to the trained neural network model 200, the first neural network module 210 may obtain per-pixel first feature data (or first feature information) included in the input image.

Meanwhile, when the image is input, the second neural network module 220 may obtain per-pixel second feature data (or second feature information) included in the input image. According to an embodiment, the second neural network module 220 may be a neural network model where some layers are changed in InceptionResNetV2. For example, the second neural network module 220 may be a neural network module where a layer with a kernel size of 3 and a padding of 0 is changed to a layer with a kernel size of 3 and a padding of 1 in InceptionResNetV2. Accordingly, the resolution of the output data may not be reduced, thereby reducing the loss of spatial information.

Here, the size of the first feature data extracted from the first neural network module 210 may be the same as the size of the input image 10, and the size of the first feature data extracted from the second neural network module 220 may be a reduced size from the size of the input image 10. For example, if the input image 10 has a size of (w, h), that is, a horizontal size of w pixels and a vertical size of h pixels, the size of the first feature data may be (w, h) and the size of the second feature data may be (w/32, h/32). This is caused by adding padding where there is no padding to maintain resolution among the plurality of layers present in the second neural network module 220.

Meanwhile, when the second feature data is input to the input layer of the first compression module 250, the first compression module may compress the input second feature data according to the first compression method to obtain the compressed second feature data. Since the number of channels of the second feature data output from the second neural network module 220 is relatively larger than the first feature data, the size of the data may be reduced in order to accelerate the computational processing speed.

Subsequently, when the compressed second feature data is input to the input layer of the upscaling module 260, the upscaling module 260 may upscale the compressed second feature data to the same size as the first feature data. In the above-described embodiment, if the size of the second feature data is (w/32, h/32) and the size of the first feature data is (w, h), the size of the second feature data output from the upscaling module 260 will be the same size (w, h) as the first feature data.

Subsequently, the combining module 270 may combine the first feature data and the upscaled second feature data to output the third feature data. Here, combining means that the data is concatenated without changing the respective data values. Accordingly, in this case, when the first feature data and the second feature data are combined, the data values do not change, and the plurality of channels corresponding to the first feature data and the plurality of channels corresponding to the second feature data are concatenated successively. For example, if the number of channels of the first feature data is 64 and the number of channels of the second feature data is 256, the number of channels of the third feature data is 320.

Subsequently, the third neural network module 230 may obtain a per-pixel quality score of the input image ("first pixel quality score") based on the third feature data output from the combining module 270.

Figure 5:
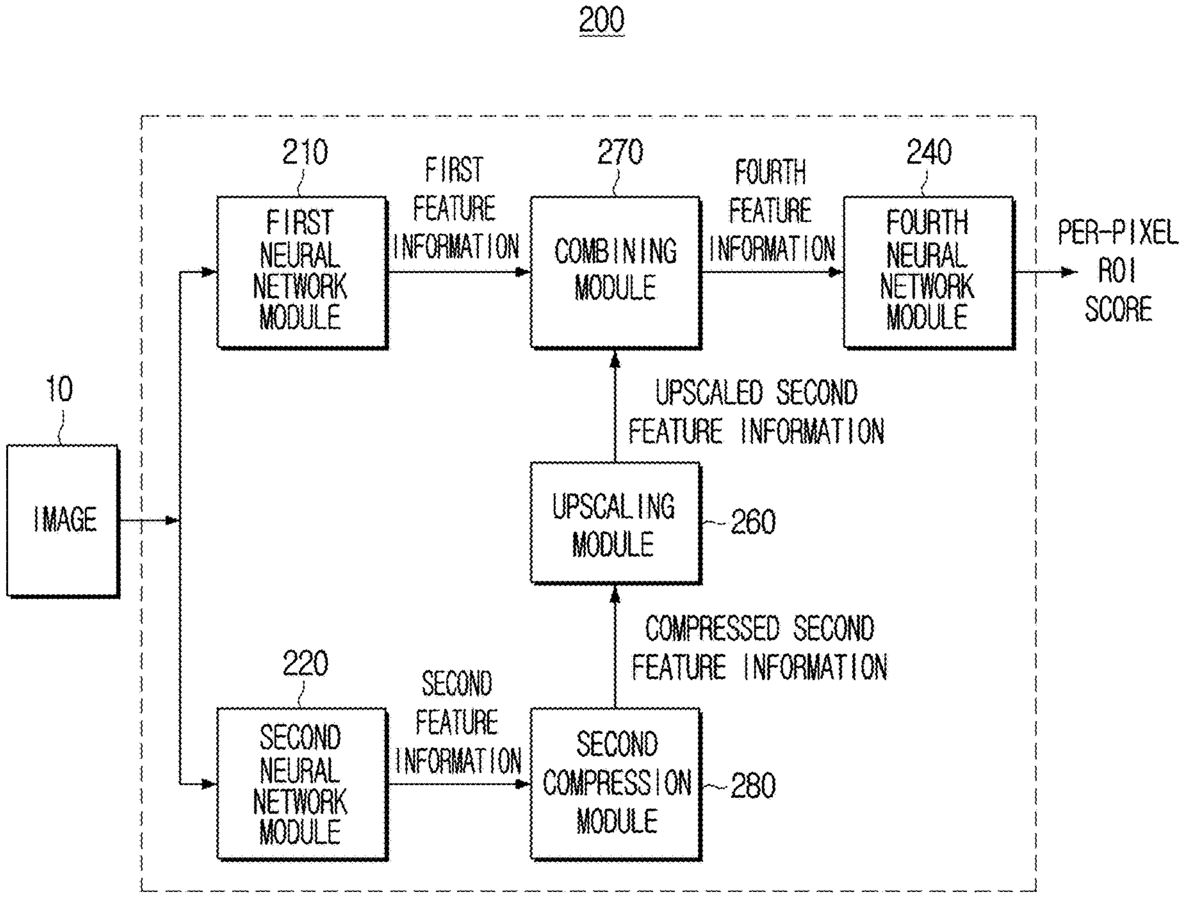
FIG. 5 is a view provided to explain a method of obtaining an ROI score for each pixel according to an exemplary embodiment.

FIG. 5 is a view provided to explain a method of obtaining an ROI score for each pixel according to an embodiment.

Referring to FIG. 5, according to an embodiment, the processor 120 may first input the image 10 into the trained neural network model 200. When the image 10 is input to the trained neural network model 200, the first neural network module 210 may obtain per-pixel first feature data (or first feature information) included in the input image. Meanwhile, the second neural network module 220 may obtain per-pixel second feature data (or second feature information) included in the input image when the image is input.

Here, the size of the first feature data extracted from the first neural network module 210 may be the same as the size of the input image 10, and the size of the first feature data extracted from the second neural network module 220 may be a reduced size from the size of the input image 10.

Meanwhile, when the second feature data is input to the input layer of the second compression module 250, the first compression module may compress the input second feature data according to the first compression method to obtain the compressed second feature data.

Subsequently, when the compressed second feature data is input to the input layer of the upscaling module 260, the upscaling module 260 may upscale the compressed second feature data to the same size as the first feature data. In the above-described embodiment, if the size of the second feature data is (w/32, h/32) and the size of the first feature data is (w, h), the size of the second feature data output from the upscaling module 260 will be the same size (w, h) as the first feature data.

Subsequently, the combining module 270 may combine the first feature data and the upscaled second feature data to output the fourth feature data. Here, combining means that the data is concatenated without changing the respective data values. Accordingly, when combining the first feature data and the second feature data, the data values do not change, and the plurality of channels corresponding to the first feature data and the plurality of channels corresponding to the second feature data are concatenated successively. For example, if the number of channels of the first feature data is 64, and the number of channels of the second feature data is 256, the number of channels of the fourth feature data is 320.

Subsequently, the fourth neural network module 240 may obtain an ROI score for each pixel included in the input image based on the fourth feature data output from the combining module 270.

Figure 6A:
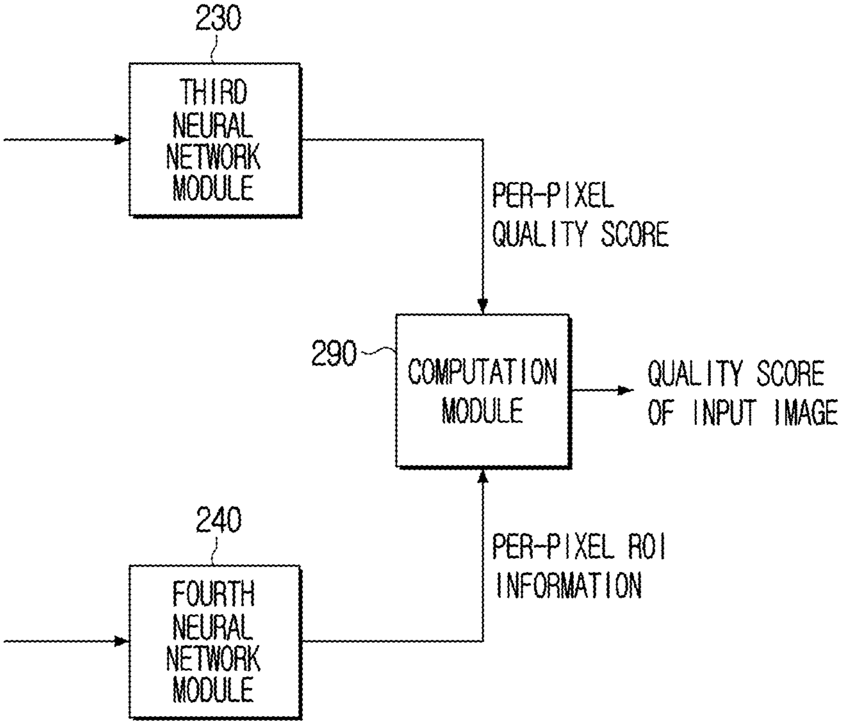
FIGS. 6A and 6B are views provided to explain a method of obtaining a quality score of an input image according to an exemplary embodiment.
Figure 6B:
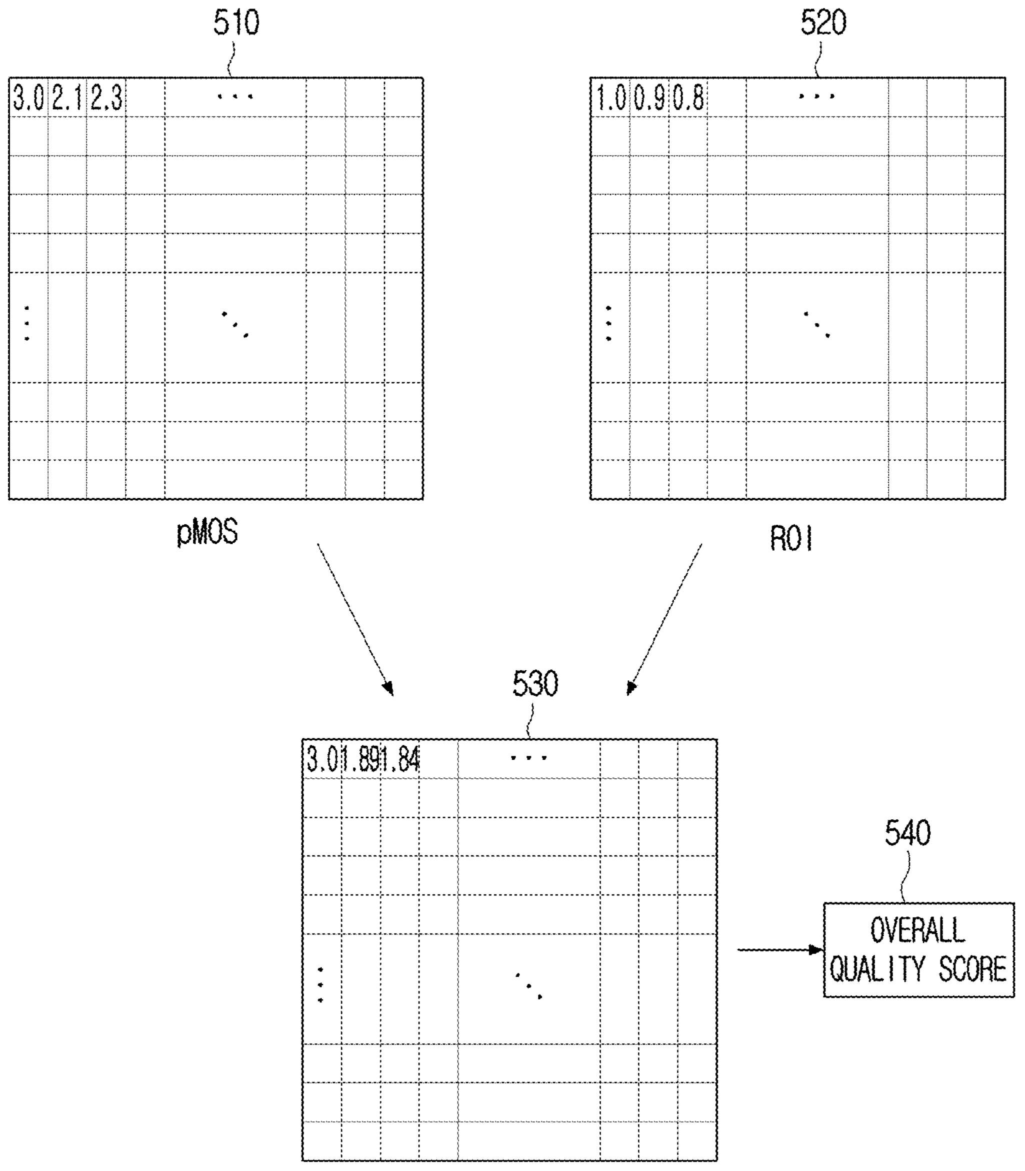

FIGS. 6A and 6B are views provided to explain a method of obtaining a quality score of an input image according to an embodiment.

Referring to FIG. 6A, according to an embodiment, when a per-pixel quality score from the third neural network module 230 and a per-pixel ROI score from the fourth neural network module 240 are input into the input layer of the computation module 290, the computation module 290 may output a quality score of the input image 10 based on the input per-pixel quality score and the per-pixel ROI score.

According to an embodiment, the computation module 290 may obtain a first value by multiplying a first quality score corresponding to a first pixel included in the input image 10 and a first ROI score corresponding to the first, a second value by multiplying a second quality score corresponding to a second pixel included in the input image 10 and a second ROI score corresponding to the second pixel, and may average the obtained first and second values to obtain a quality score of the input image. For example, as shown in FIG. 6B, a per-pixel quality score 610 and a per-pixel ROI score 620 may have a corresponding score for each pixel. In this case, the computation module 290 may obtain a value 530 multiplied by the corresponding scores for each pixel, and may output the median of the obtained first and second values as an overall quality score 540 (also referred to herein as "image quality score").

According to another example, the computation module 290 may obtain a first value by multiplying a first quality score corresponding to a first pixel and a first ROI score corresponding to the first pixel, obtain a second value by multiplying a second quality score corresponding to a second pixel and a second ROI score corresponding to the second pixel included in the input image, and output a median of the obtained first and second values as a quality score of the input image.

Alternatively, the computation module 290 may normalize the first value and the second value, respectively, and multiply the normalized first value and the normalized second value to obtain a quality score for the input image.

Figure 7A:
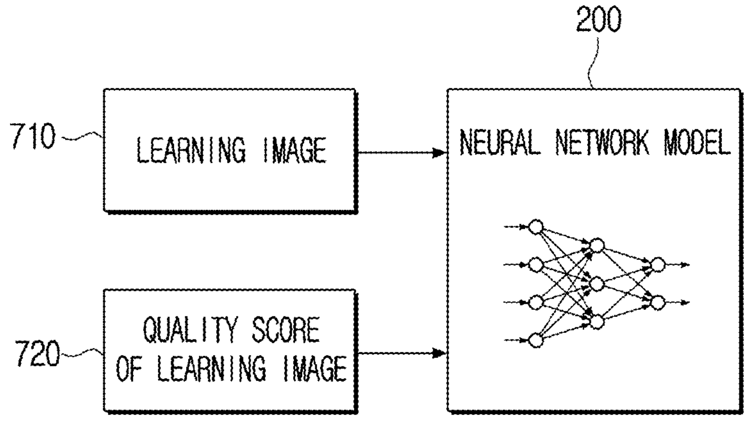
FIGS. 7A to 7D are views provided to explain a method of training a neural network model according to an exemplary embodiment.
Figure 7B:
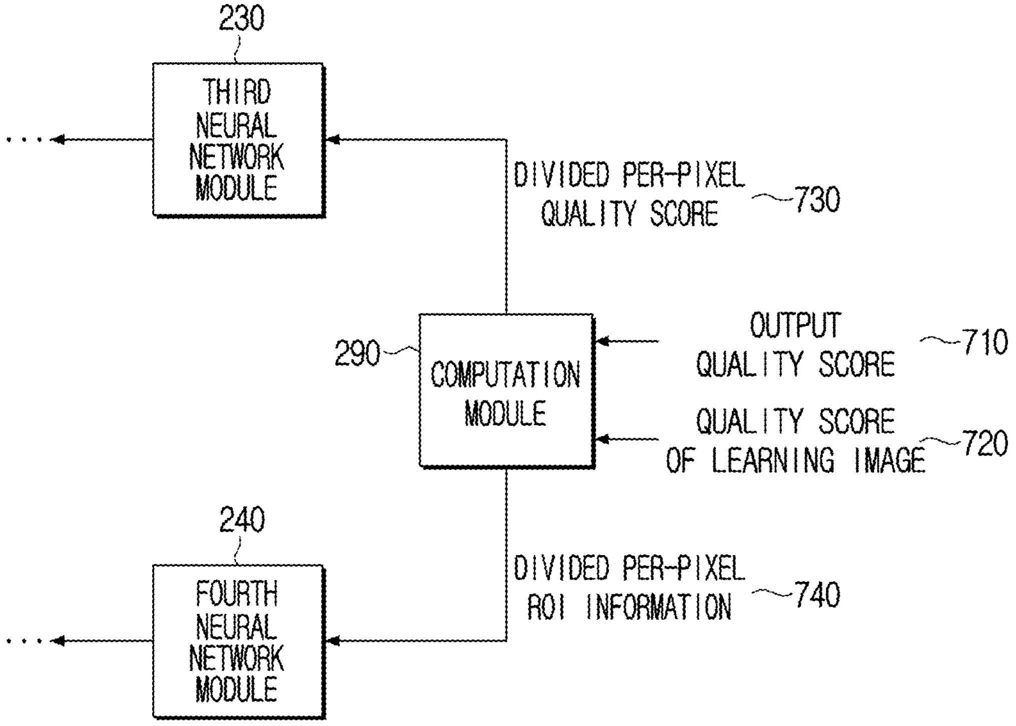

FIGS. 7A and 7B are views provided to explain a method of training a neural network model according to an embodiment.

According to an embodiment, a neural network model stored in the memory 110 may be created through leaning. Here, being created through learning means that the basic neural network model is trained using a large number of learning data by a learning algorithm, thereby creating a predefined operation rule or a neural network model set to perform the desired characteristics (or purpose). Such learning may be performed through a separate server and/or system according to the present disclosure, but is not limited thereto and may also be performed in the electronic device 100. Examples of learning algorithms include, but are not limited to, unsupervised learning, semi-supervised learning, or reinforcement learning.

Referring to FIG. 7A, according to an embodiment, the trained neural network model 200 may divide the quality score output from the trained neural network model into a per-pixel quality score ("second pixel quality score") and a per-pixel ROI score as a learning image 710 and a quality score 720 ("reference quality score") of the learning image are input, and may be trained through unsupervised learning by feeding the per-pixel quality score and the per-pixel ROI score back to the third neural network module 230 and the fourth neural network module 240.

Referring to FIG. 7B, according to an embodiment, the trained neural network model 200 may divide the quality score 710 ("image quality score") output via the computation module 290 into a per-pixel quality score 730 ("second pixel quality score") and a per-pixel ROI score 740, and update at least one of the weights corresponding to the plurality of neural network layers included in the third neural network module 230 and the weights corresponding to the plurality of neural network layers included in the fourth neural network module 240, thereby having unsupervised training. For example, the neural network model 200 may set a per-pixel ROI in a learning image through the computation module 290, and divide the quality score 710 into a per-pixel quality score 730 and a per-pixel ROI score 740 based on a region of interest and a region of non-interest on the basis of the set ROI. For example, the neural network model 200 may identify a ROI by clustering pixels in an image through the computation module 290, and divide the quality score 710 into a per-pixel quality score 730 and a per-pixel ROI score 740 based on the clustering result.

For example, if the output quality score 710 is relatively smaller than the quality score 720 of the learning image, the neural network module 200 may identify pixels whose ROI scores have magnitudes greater than or equal to a threshold value, and update the weights of the neural network layer such that the quality score of the pixels whose ROI scores have magnitudes greater than or equal to the threshold value has a larger value than before. Accordingly, the output quality score 710 has a larger value than before, and is closer to the magnitude of the quality score 720 of the learning image.

As another example, if the output quality score 710 is relatively larger than the quality score 720 of the learning image, the weights of the neural network layer may be updated such that the quality score of pixels whose ROI scores have magnitudes below a threshold value has a smaller value than before. Accordingly, the output quality score 710 has a smaller value than before and is closer to the magnitude of the quality score 720 of the learning image.

Meanwhile, according to an embodiment, a loss function may be used in the trained neural network module 200 described above. For example, the loss function of Equation 2 may be used, as shown below.

$$L(P, G) = |P - G| = \left|\sum_{(i=1)}^{M}\sum_{(j=1)}^{N} p_{(i,j)} \times r_{(i,j)} - G\right|. \quad \text{[Equation 2]}$$

Here, P and G denote the MOS predicted value and the ground-truth MOS predicted value, respectively, and $p=(p_{(1,1)}, \ldots, p_{(M,M)})$ denotes the set of pMOS (per-pixel quality score) predicted values. According to Equation 2, ROI may have unsupervised training without the ground-truth per-pixel quality score and the ground-truth per-pixel ROI score.

Meanwhile, when the neural network model 200 is trained to output the ROI score per pixel according to Equation 2, p becomes the learning weight. Accordingly, the neural network module that outputs the ROI will have a higher learning weight for higher MOS and a lower learning weight for lower MOS. For example, when the MOS size range is 1 to 5, the learning speed of the neural network module that outputs ROI is about 5 times different than when the MOS size range is outside the range of 1 to 5. Therefore, there is a need to adjust the learning weight.

Figure 7C:
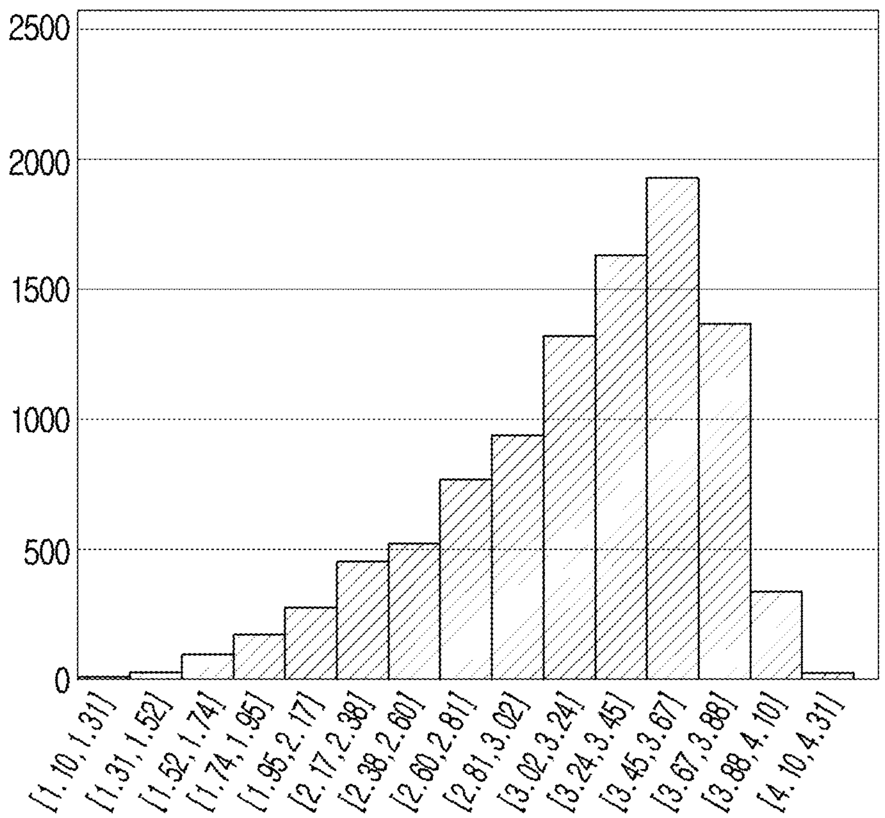
Figure 7D:
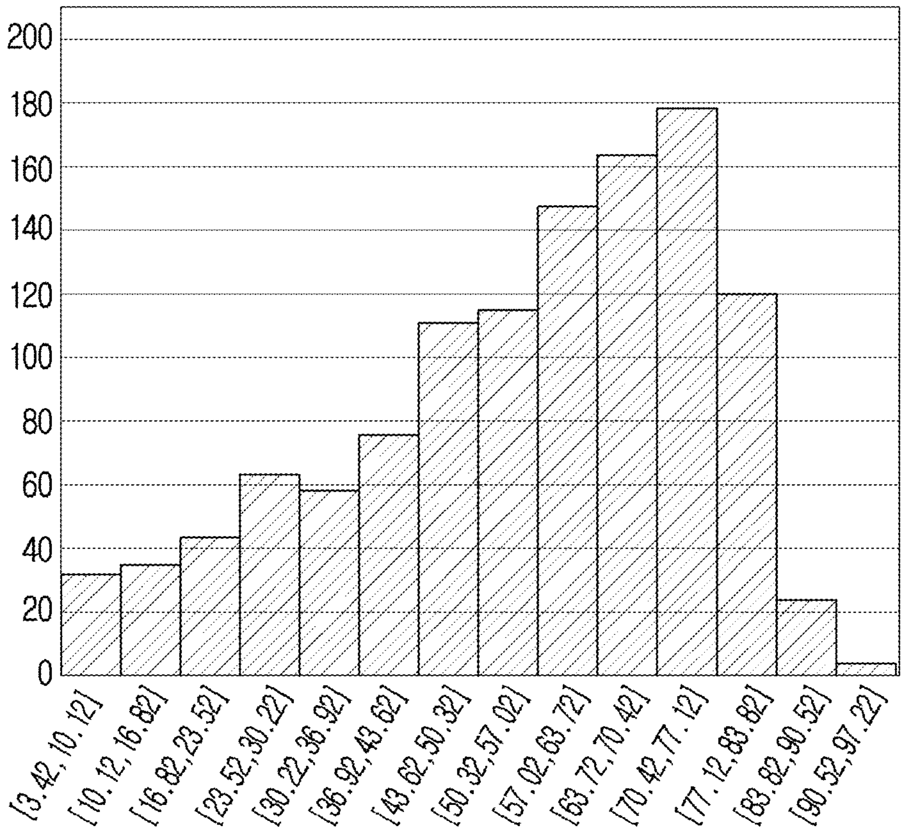

Meanwhile, FIGS. 7C and 7D are the MOS distribution tables of the KonIQ-10k and LIVE Challenge datasets of the input images, respectively. In the graphs shown, the horizontal axis represents the size range of MOS, and the vertical axis represents the number of samples.

Referring to FIGS. 7C and 7D, the closer the relative MOS size is to the center (e.g., [57.02, 63.72]), the higher the number of counts and thus the higher the probability of corresponding thereto, and in the opposite case, the size of the corresponding MOS relatively decreases and the probability of corresponding thereto also decreases relatively. Accordingly, from the point of view of entropy, there is more information at the two ends ([3.42, 10.12] or [90.52, 97.22]) than at the center of the MOS. Based on this, if the neural network model 200 changes the mean value of p to 0 when learning, the learning weight will be lower in the center of the MOS and higher towards the two ends, so the loss function may be changed as shown in Equation 3 to increase the learning weight where there is more information.

$$L_{ms}(P_{ms}, G) = |P_{ms} - G| = \left|\sum_{(i=1)}^{M}\sum_{(j=1)}^{N}\left(p_{(i,j)} - \bar{p}\right) \times r_{(i,j)} - G\right| \quad \text{[Equation 3]}$$

$$\bar{p} = \frac{1}{MN}\sum_{(i=1)}^{M}\sum_{(j=1)}^{N}(p_{(i,j)}).$$

Here, P and G denote the MOS predicted value and the ground-truth MOS predicted value, respectively, and $p=(p_{(1,1)}, \ldots, p_{(M,M)})$ denotes the set of pMOS (per-pixel quality score) predicted values. Equation 3 is the output MOS value in a state where the mean is shifted compared to Equation 2.

According to an embodiment, the performance evaluation of the trained neural network model 200 was performed with Pearson's Linear Correlation Coefficient (PLCC) and Spearman's Rank Order Correlation Coefficient (SRCC). PLCC measures the accuracy of the prediction and SRCC measures the monotonicity of the prediction. Each number ranges from −1 to 1, with higher values indicating better performance.

Meanwhile, a performance comparison of the trained neural network model with Image-Quality-Evaluation (IQA) methods was performed through Table 1. Referring to Table 1, the trained neural network model of the present disclosure has the highest PLCC and SRCC results compared to other methods (e.g., GraphIQA, HyperIQA, TRIQ, and TranSLA) on both KonIQ dataset and LIVEC dataset. Meanwhile, Table 1 shows that the RMSE on KonIQ dataset is reduced by more than 6% compared to traditional methods.

TABLE 1

| | KonIQ-10k | | | LIVEC | | |
|---|---|---|---|---|---|---|
| Method | PLCC | SRCC | RMSE | PLCC | SRCC | RMSE |
| GraphIQA | 0.922 | 0.907 | — | 0.886 | 0.863 | — |
| HyperIQA | 0.917 | 0.906 | — | 0.882 | 0.859 | — |
| TRIQ | 0.923 | 0.902 | 0.225 | 0.878 | 0.849 | 0.392 |
| TranSLA | 0.931 | 0.915 | 0.206 | 0.900 | 0.873 | 0.359 |
| Proposed method | 0.943 | 0.925 | 0.191 | 0.914 | 0.900 | 0.231 |

In addition, an ablation study was conducted to investigate the performance of the trained neural network model of the present disclosure. Table 2 shows the results of adding the proposed modules step by step. The network consisting of only Local IQA (corresponding to the first neural network module of the present disclosure) performs poorly because the MOS is trained to have the same weight at all locations. When ROI prediction (the third neural network module of the present disclosure) is added, the performance is significantly improved compared to before by allowing the important part of the IQA to be focused. Finally, high-level feature embedding (the second neural network module of the present disclosure) covers the part that was not performed in local IQA (the first neural network module of the present disclosure), thereby causing another performance improvement.

TABLE 2

| | KonIQ-10k | | | LIVEC | | |
|---|---|---|---|---|---|---|
| Components | PLCC | SRCC | RMSE | PLCC | SRCC | RMSE |
| Local IQA | 0.697 | 0.664 | 0.436 | 0.595 | 0.628 | 0.522 |
| Local IQA + ROI | 0.839 | 0.812 | 0.367 | 0.762 | 0.752 | 0.379 |
| Local IQA + ROI + High-level | 0.943 | 0.925 | 0.191 | 0.914 | 0.900 | 0.231 |

Figure 8:
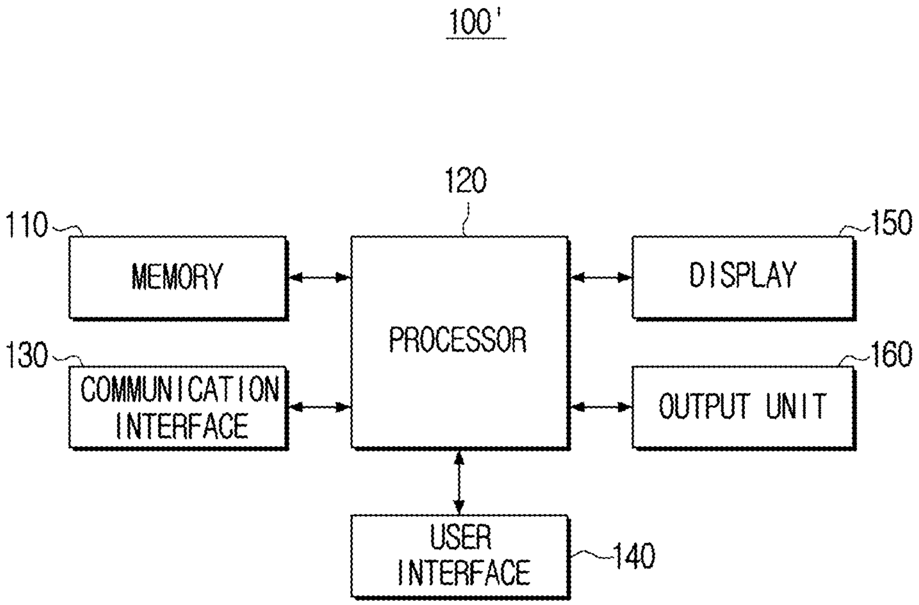
FIG. 8 is a view provided to explain detailed configuration of an electronic device according to an exemplary embodiment.

FIG. 8 is a view provided to explain detailed configuration of an electronic device according to an embodiment.

Referring to FIG. 8, an electronic device 100' may include the memory 110, the processor 120, the communication interface 130, the user interface 140, a display 150, and an output unit 160. Any of the configurations shown in FIG. 8 that are duplicative of the configurations shown in FIG. 2 will not be described in detail.

The communication interface 130 may perform communication with an external device. For example, the communication interface 130 may receive image signals from an external device (e.g., source device), an external storage medium (e.g., universal serial bus (USB) memory), an external server (e.g., web hard) or the like through a communication method such as an access point (AP)-based wireless fidelity (Wi-Fi, i.e. wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication by using a streaming or a downloading method. According to an embodiment, the processor 120 may receive an image from an external device (not shown) through the communication interface 130.

The user interface 140 may be implemented as a device such as a button, a touch pad, a mouse, and a keyboard, or may be implemented as a touch screen, a remote control transmitting/receiving unit, etc. capable of performing the above-described display function and manipulation input function. The remote control transmitting/receiving unit may receive a remote control signal from an external remote control device through at least one of an infrared communication, Bluetooth communication or Wi-Fi communication, or transmit a remote control signal.

The display 150 may be implemented as a display including a self-light emitting device or a display including a non-light emitting device and a backlight. For example, the display 150 may be implemented as various types of displays such as liquid crystal display (LCD), organic light emitting diodes (OLED) display, Light Emitting Diodes (LED), micro LED, Mini LED, Plasma Display Panel (PDP), Quantum dot (QD) display, a quantum dot light-emitting diode (QLED) display, and the like. The display 150 may also include a driving circuit that can be implemented in the form of Amorphous Silicon Thin-Film Transistor (a-si TFT), low temperature poly silicon Thin-Film Transistor (LTPS TFT), Organic Thin-Film Transistor (OTFT), etc., a backlight unit, etc. Meanwhile, the display 150 may be implemented as a touch screen combined with a touch sensor, a flexible display, a rollable display, a 3D display, a display in which a plurality of display modules are physically connected, etc.

The output unit 160 outputs an acoustic signal. For example, the output 160 may convert a digital acoustic signal processed by the processor 120 to an analog acoustic signal, amplify it, and output it. For example, the output unit 160 may include at least one speaker unit, a D/A converter, an audio amplifier, or the like, capable of outputting at least one channel. In some examples, the output 160 may be implemented to output a variety of multi-channel acoustic signals. In this case, the processor 120 may control the output 160 to enhance and output an input acoustic signal to correspond to the enhancement of the input image.

Figure 9:
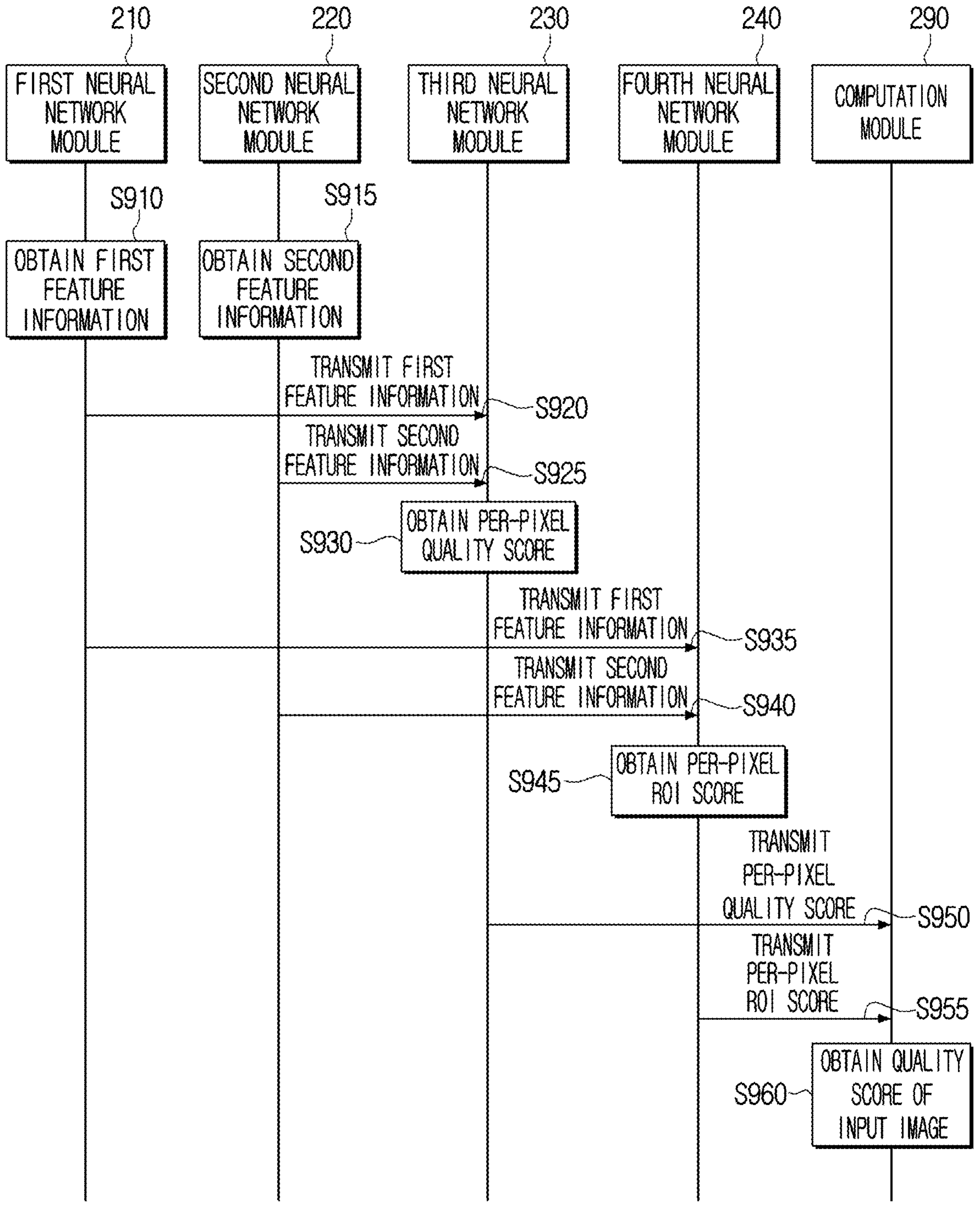
FIG. 9 is a flowchart provided to explain a method of obtaining a quality score of an input image according to an exemplary embodiment.

FIG. 9 is a flowchart provided to explain a method of obtaining a quality score of an input image according to an embodiment.

Referring to FIG. 9, according to an embodiment, the trained neural network model 200 may include the first neural network module 210, the second neural network module 220, the third neural network module 230, the fourth neural network module 240, and the computation module 290.

Firstly, according to an embodiment, when an image is input, the first neural network module 210 may obtain first feature information for each pixel included in the input image (S910).

Meanwhile, when the image is input, the second neural network module 220 may obtain second feature information for each pixel included in the input image (S915).

Subsequently, the first neural network module 210 may transmit the obtained first feature information to the third neural network module 230 (S920), and the obtained first feature information may be transmitted to the fourth neural network module 240 (S935).

Subsequently, the second neural network module 220 may transmit the obtained second feature information to the third neural network module 230 (S925), and the obtained second feature information may be transmitted to the fourth neural network module 240 (S940).

Subsequently, when the first feature information is transmitted from the first neural network module 210 (S920) and the second feature information is transmitted from the second neural network module 220 (S925), the third neural network module 230 may obtain a per-pixel quality score of the input image using third feature information in which the transmitted first feature information and second feature information is combined (S930). In this case, according to an embodiment, the first feature information and the second feature information may be combined via a combining module present within the trained neural network model 200, but is not limited thereto.

Meanwhile, when the first feature information is transmitted from the first neural network module 210 (S920) and the second feature information is transmitted from the second neural network module 220 (S925), the fourth neural network module 240 may obtain a quality score for each pixel included in the input image using the third feature information in which the transmitted first feature information and second feature information is combined (S930). In this case, according to an embodiment, the first feature information and the second feature information may be combined via a combining module present within the trained neural network model 200, but is not limited thereto.

Meanwhile, the fourth neural network module 240 may obtain a ROI score for each pixel included in the input image based on the fourth feature information in which the first feature information obtained from the first neural network module 210 and the second feature information obtained from the second neural network module 220 is combined (S945). In this case, according to an embodiment, the first feature information and the second feature information may be combined via a combining module present within the trained neural network model.

Subsequently, when the per-pixel quality score is obtained (S930), the third neural network module 230 may transmit the obtained per-pixel quality score to the computation module 290 (S950). In addition, when the per-pixel ROI score is obtained (S945), the fourth neural network module 240 may transmit the obtained per-pixel ROI score to the computation module 290 (S955).

Subsequently, the computation module 290 may obtain a quality score of the input image based on the per-pixel quality score obtained from the third neural network module 230 and the per-pixel ROI score obtained from the fourth neural network module 240 (S960).

According to various embodiments described above, it is possible to obtain information regarding per-pixel quality evaluation scores and regions of interest of an input image by only inputting the image into a trained neural network model, and based on that, obtain an overall quality evaluation score for the input image. This reduces the time and cost required to acquire information on per-pixel quality evaluation scores and regions of interest in the image.

Meanwhile, the methods according to the above-described various embodiments of the disclosure may be implemented in the form of an application which may be installed in the existing electronic device. Alternatively, the methods according to the above-described various embodiments may be performed using a neural network trained based on deep learning (or deep learned neural network), that is, a learning network model. Alternatively, the methods according to the above-described various embodiments may be implemented only by software upgrade or hardware upgrade of the existing electronic device. Alternatively, the above-described various embodiments may be performed through an embedded server included in the electronic device, or an external server of the electronic device.

Meanwhile, according to an embodiment, the above-described various embodiments may be implemented in software including an instruction stored in a machine-readable storage medium that can be read by a machine (e.g., a computer). A machine may be a device that invokes the stored instruction from the storage medium and be operated based on the invoked instruction, and may include a display device (e.g., display device (A)) according to embodiments. In case that the instruction is executed by the processor, the processor may directly perform a function corresponding to the instruction or other components may perform the function corresponding to the instruction under the control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to an embodiment, the above-described various embodiments may be provided by being included in a computer program product. The computer program product may be traded as a product between a seller and a purchaser. The computer program product may be distributed in a form of the storage medium (e.g., a compact disc read only memory (CD-ROM)) that may be read by the machine or online through an application store (e.g., Play-Store™). In case of the online distribution, at least portions of the computer program product may be at least temporarily stored or temporarily generated in a storage medium such as a memory of a server of a manufacturer, a server of an application store or a relay server.

In addition, each component (e.g., module or program) in the various examples described above may include one entity or a plurality of entities, and some of the corresponding sub-components described above may be omitted or other sub-components may be further included in the various examples. Alternatively or additionally, some of the components (e.g., modules or programs) may be integrated into one entity, and may perform functions performed by the respective corresponding components before being integrated in the same or similar manner. Operations performed by the modules, the programs, or other components in the various examples may be executed in a sequential manner, a parallel manner, an iterative manner, or a heuristic manner, or at least some of the operations may be performed in a different order or be omitted, or other operations may be added While embodiments of the disclosure have been illustrated and described herein, the disclosure is not limited thereto and variously modifications may be made therein by those of ordinary skill in the art without departing from the gist of the disclosure as claimed in the accompanying claims. These modifications should not be understood separately from the technical spirit or prospect of the disclosure.

What is claimed is:

1. An electronic device comprising:

a memory configured to store a trained neural network model; and a processor configured to, by inputting an input image to the trained neural network model, obtain an image quality score of the input image, a pixel quality score for each pixel included in the input image and a Region of Interest (ROI) score for the each pixel, wherein the trained neural network model comprises:

a first neural network module configured to obtain first feature information for the each pixel included in the input image;

a second neural network module configured to obtain second feature information for the each pixel included in the input image;

a third neural network module configured to obtain a first pixel quality score of each pixel included in the input image based on third feature information in which the first feature information and the second feature information are combined;

a fourth neural network module configured to obtain an ROI score for the each pixel based on fourth feature information in which the first feature information and the second feature information are combined; and a computation module configured to obtain the image quality score of the input image based on the first pixel quality score for the each pixel and the ROI score for the each pixel.

2. The electronic device as claimed in claim 1, wherein the first feature information comprises at least one of edge information or noise information included in the input image; and wherein the second feature information comprises object information regarding an object included in the input image.

3. The electronic device as claimed in claim 1, wherein the computation module is further configured to:

obtain a first value by multiplying a first quality score corresponding to a first pixel included in the input image and a first ROI score corresponding to the first pixel;

obtain a second value by multiplying a second quality score corresponding to a second pixel included in the input image and a second ROI score corresponding to the second pixel; and obtain the image quality score of the input image based on a median of the first value and the second value.

4. The electronic device as claimed in claim 1, wherein the trained neural network model is configured to:

as a learning image and a reference quality score of the learning image are input, divide the image quality score output from the trained neural network model into a second pixel quality score for the each pixel and the ROI score for the each pixel; and receive unsupervised training by feeding the second pixel quality score for the each pixel and the ROI score for the each pixel back to the third neural network module and the fourth neural network module.

5. The electronic device as claimed in claim 1, wherein the trained neural network model is further configured to:

divide the image quality score output from the computation module into a second pixel quality score for the each pixel and an ROI score for the each pixel; and receive unsupervised training by updating one of a first weight corresponding to a first plurality of neural network layers included in the third neural network module and a second weight corresponding to a second plurality of neural network layers included in the fourth neural network module based on the second pixel quality score for the each pixel and the ROI score for the each pixel.

6. The electronic device as claimed in claim 1, wherein the first neural network module is configured to output first feature data of the same size as a first size of the input image; and wherein the second neural network module is configured to output second feature data of a second size reduced from the first size of the input image.

7. The electronic device as claimed in claim 6, wherein the trained neural network model comprises:

a first compression module configured to compress the second feature data according to a first compression method;

an upscaling module configured to upscale the second feature data to the same size as the first feature data; and a combining module configured to combine the first feature data and the upscaled second feature data, wherein the third neural network module is configured to obtain a quality score for the each pixel included in the input image based on the third feature information output from the combining module.

8. The electronic device as claimed in claim 6, wherein the trained neural network model comprises:

a second compression module configured to compress the second feature data according to a second compression method;

an upscaling module configured to upscale the second feature data to the same size as the first feature data; and a combining module configured to combine the first feature data and the upscaled second feature data, wherein the fourth neural network module is configured to obtain an ROI score for the each pixel included in the input image based on the fourth feature information output from the combining module.

9. The electronic device as claimed in claim 1, wherein each of the first neural network module to the fourth neural network module includes a plurality of neural network layers;

wherein the third feature information is a first combination of the first feature information output from an output layer of the first neural network module and the second feature information output from an output layer of the second neural network module, and the third feature information is input to an input layer of the third neural network module; and wherein the fourth feature information is a second combination of the first feature information output from an output layer of the first neural network module and the second feature information output from an output layer of the second neural network module, and the fourth feature information is input to an input layer of the fourth neural network module.

10. A controlling method of an electronic device, the controlling method comprising:

by inputting an input image to a trained neural network model, obtaining an image quality score of the input image, a pixel quality score for each pixel included in the input image and a Region of Interest (ROI) score for the each pixel, wherein the trained neural network model comprises a first neural network module, a second neural network module, a third neural network module, a fourth neural network module, and a computation module;

wherein the obtaining comprises:

by the first neural network module, obtaining first feature information for the each pixel included in the input image;

by the second neural network module, obtaining second feature information for the each pixel included in the input image;

by the third neural network module, obtaining a first pixel quality score for the each pixel included in the input image based on third feature information in which the first feature information and the second feature information are combined;

by the fourth neural network module, obtaining an ROI score for the each pixel based on fourth feature information in which the first feature information and the second feature information are combined; and by the computation module, obtaining the image quality score of the input image based on the first pixel quality score for the each pixel and the ROI score of the each pixel.

11. The controlling method as claimed in claim 10, wherein the first feature information comprises at least one of edge information or noise information included in the input image; and wherein the second feature information comprises object information regarding an object included in the input image.

12. The controlling method as claimed in claim 10, wherein the obtaining a quality score of the input image comprises:

obtaining a first value by multiplying a first quality score corresponding to a first pixel included in the input image and a first ROI score corresponding to the first pixel;

obtaining a second value by multiplying a second quality score corresponding to a second pixel included in the input image and a second ROI score corresponding to the second pixel; and obtaining the image quality score of the input image based on a median of the first value and the second value.

13. The controlling method as claimed in claim 10, wherein the trained neural network model is configured to:

as a learning image and a reference quality score of the learning image are input, divide the image quality score output from the trained neural network model into a second pixel quality score for the each pixel and an ROI score for the each pixel; and receive unsupervised training by feeding the second pixel quality score for the each pixel and the ROI score for the each pixel back to the third neural network module and the fourth neural network module.

14. The controlling method as claimed in claim 10, wherein the trained neural network model is configured to:

divide the image quality score output from the computation module into a second pixel quality score for the each pixel and divide an ROI score for the each pixel; and receive unsupervised training by updating first weights of the third neural network module and second weights of the fourth neural network module based on the second pixel quality score for the each pixel and the divided ROI score for the each pixel.

15. A non-transitory computer readable recording medium storing computer instructions that, when executed by a processor of an electronic device, cause the electronic device to perform an operation, the operation comprises:

by inputting an input image to a trained neural network model, obtaining an image quality score of the input image, a first pixel quality score for each pixel included in the input image and a Region of Interest (ROI) score for the each pixel, wherein the trained neural network model comprises a first neural network module, a second neural network module, a third neural network module, a fourth neural network module, and a computation module;

wherein the obtaining comprises:

by the first neural network module, obtaining first feature information for the each pixel included in the input image;

by the second neural network module, obtaining second feature information for the each pixel included in the input image;

by the third neural network module, obtaining a quality score for the each pixel included in the input image based on third feature information in which the first feature information and the second feature information is combined;

by the fourth neural network module, obtaining an ROI score for the each pixel based on fourth feature information in which the first feature information and the second feature information is combined; and by the computation module, obtaining the image quality score of the input image based on the first pixel quality score for the each pixel and the ROI score of the each pixel.

16. The non-transitory computer readable medium of claim 15, wherein the first feature information comprises at least one of edge information or noise information included in the input image; and wherein the second feature information comprises object information regarding an object included in the input image.

17. The non-transitory computer readable medium of claim 15, wherein the obtaining a quality score of the input image comprises:

obtaining a first value by multiplying a first quality score corresponding to a first pixel included in the input image and a first ROI score corresponding to the first pixel;

obtaining a second value by multiplying a second quality score corresponding to a second pixel included in the input image and a second ROI score corresponding to the second pixel; and obtaining the image quality score of the input image based on a median of the first value and the second value.

18. The non-transitory computer readable medium of claim 15, wherein the trained neural network model comprises:

as a learning image and a reference quality score of the learning image are input, dividing the image quality score output from the trained neural network model into a second pixel quality score for the each pixel and an ROI score for the each pixel; and receiving unsupervised training by feeding the second pixel quality score for the each pixel and the ROI score for the each pixel back to the third neural network module and the fourth neural network module.

19. The non-transitory computer readable medium of claim 15, wherein the trained neural network model comprises:

dividing the image quality score output from the computation module into a second pixel quality score for the each pixel and divide an ROI score for the each pixel; and receiving unsupervised training by updating first weights of the third neural network module and second weights of the fourth neural network module based on the second pixel quality score for the each pixel and the divided ROI score for the each pixel.

20. The non-transitory computer readable medium of claim 15, wherein the first neural network module is configured to output first feature data of the same size as a first size of the input image; and wherein the second neural network module is configured to output second feature data of a second size reduced from the first size of the input image.

* * * * *